Jan. 29, 1957    B. W. BRUCKMANN    2,779,565
AIR COOLING OF TURBINE BLADES
Filed Jan. 5, 1948    2 Sheets-Sheet 1

INVENTOR.
BRUNO W. BRUCKMANN
BY Wade Koontz AND
ATTORNEY
H. H. Losche
AGENT

Jan. 29, 1957  B. W. BRUCKMANN  2,779,565
AIR COOLING OF TURBINE BLADES
Filed Jan. 5, 1948  2 Sheets-Sheet 2
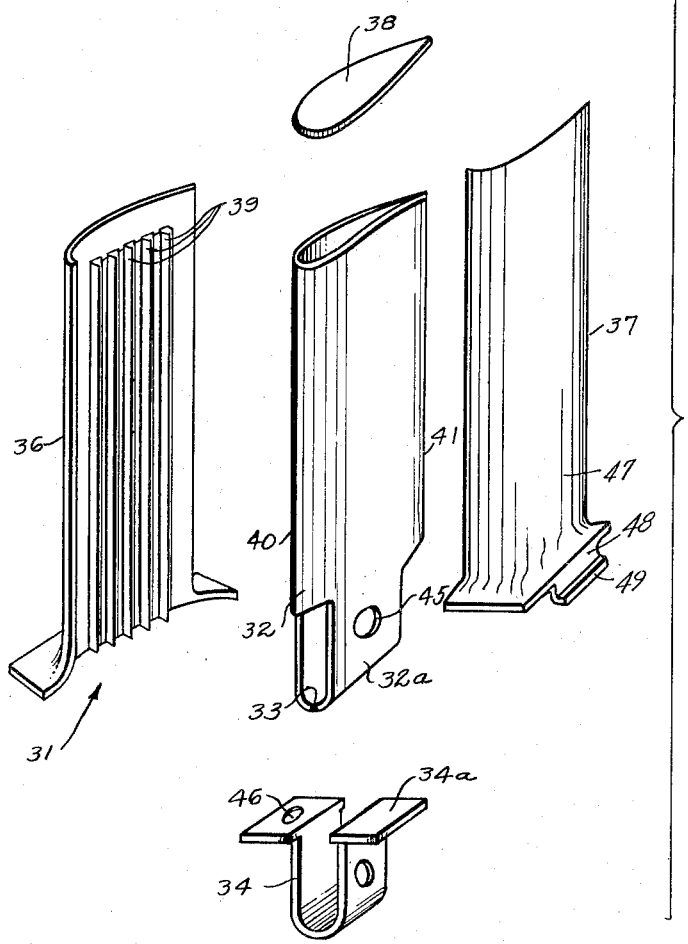
INVENTOR.
BRUNO W. BRUCKMANN
BY
ATTORNEY
AGENT United States Patent Office 2,779,565
Patented Jan. 29, 1957

2,779,565
AIR COOLING OF TURBINE BLADES
Bruno W. Bruckmann, Cincinnati, Ohio
Application January 5, 1948, Serial No. 479
6 Claims. (Cl. 253—39.15)
(Granted under Title 35, U. S. Code (1952), sec. 266)

The invention described herein may be manufactured and used by or for the Government for governmental purposes without payment to me of any royalty thereon.

This invention relates to turbine rotor construction of axial flow turbines, and more particularly to means of cooling the turbine rotor blades by utilization of centrifugal force and thermosyphoning effects of the coolant.

Improvements in axial flow gas turbines to obtain more efficient operation and greater power output has amplified the ever existent problem of dissipating the generated heat therefrom which generated heat has approached temperatures above the safe operating temperatures of the metal turbine elements—particularly the turbine rotor blades. Many rotor blade cooling means and methods have been proposed and tried but all of these cooling devices have known disadvantages. One type of cooling system diverts a part of the air passing into the compressor intake into the root end of hollow rotor blades of the turbine rotor and this air is centrifugally thrown out openings in the head of the rotor blades to be mixed with the gas-air flow at the blade tip or head. This method has the disadvantages of causing a loss of compressed air for the turbine, of diminishing the ability of the air diverted for cooling the rotor blades because of the temperature rise produced by the high compression necessary to maintain the cooling flow, of diminishing the gas flow in the combustion cycle, and of mixing and pressure losses. As air volume expended for the cooling of a single stage is about one and a half percent of the entire air flow with this type of cooling, the losses are greater, especially if they increase with the number of stages to be cooled, as in multiple stage turbines.

Other means of cooling utilizes cooling passages through the rotor disk and blades, or only about the periphery of the rotor disk for cooling the blade roots, wherein a coolant, as air or water, is pumped through the cooling passages by separate power means or a separate pump powered by the turbine. The necessity of the pump represents a considerable power loss to the turbine.

In accordance with the present invention, a portion of the intake air is admitted through a hollow turbine shaft and centrifugally forced outwardly through constructed passages and through an inner tubular blade holder member of each rotor blade. The outer end of the blade holder member admits the air to the space between the blade sheath and the blade holder which, while cooling the blade sheath, becomes considerably warmer. The specific weight difference that is caused by warming of the air results in a "lift" of the air which is directed toward the axis of rotation of the turbine. The air is then passed back into the jet stream from the center of the turbine rotor which jet stream also produces a suction of the cooling air flow that greatly aids the air cooling circulation. By this means, no appreciable power is expended by the turbine for cooling, the ratio of air flow for combustion is maintained, and a great head of cooling air is available providing a great potential of heat transfer which permits higher operating temperatures or revolutions per minute of the turbine.

One of the primary objects of this invention is to provide a turbine rotor construction wherein the rotor blades thereof are air cooled without appreciable energy or efficiency loss to the turbine.

Another object of this invention is to provide a turbine rotor construction in which cooling air is centrifugally forced through inner passages to the heads of the rotor blades and reversed by thermosyphon centripetal forces to the center of the turbine for being exhausted.

It is a further object of this invention to provide a turbine rotor construction in which cooling air is drawn through a hollow turbine shaft and centrifugally forced through passages in the periphery of an attached hollow radially partitioned rotor disk through blade holders where the air contacts the blade sheaths to increase its temperature and to lessen its density producing a thermosyphon centripetal force diminishing the centrifugal force to return the cooling air along the blade sheaths through passages to the hollow disk for egress centrally therefrom.

It is still a further object of this invention to provide a gas turbine rotor blade construction in which a blade sheath having a streamline cross-section and closed head is made integral with an internal similarly shaped blade holder at their edges of least radius of curvature with the heads of the blade holder and blade sheath in spaced relation and the portions between the integral portions of the blade holder and sheath being separated and divided into longitudinal cooling passages such that a gaseous coolant admitted at the blade holder root by passages from a hollow blade rotor disk will be centrifugally thrown to the blade head where contact with the blade sheath raises its temperature lessening its density and causing it to "lift" toward the blade root between the holder and sheath through the longitudinal passages to re-enter the rotor disk and be spilled in the downstream side of the rotor.

These and other objects will become more apparent as the description proceeds taken in conjunction with the accompanying drawings, in which:

Fig. 4 is an exploded view of a rotor blade formed in the manner conceived by this invention.

Figure 1:
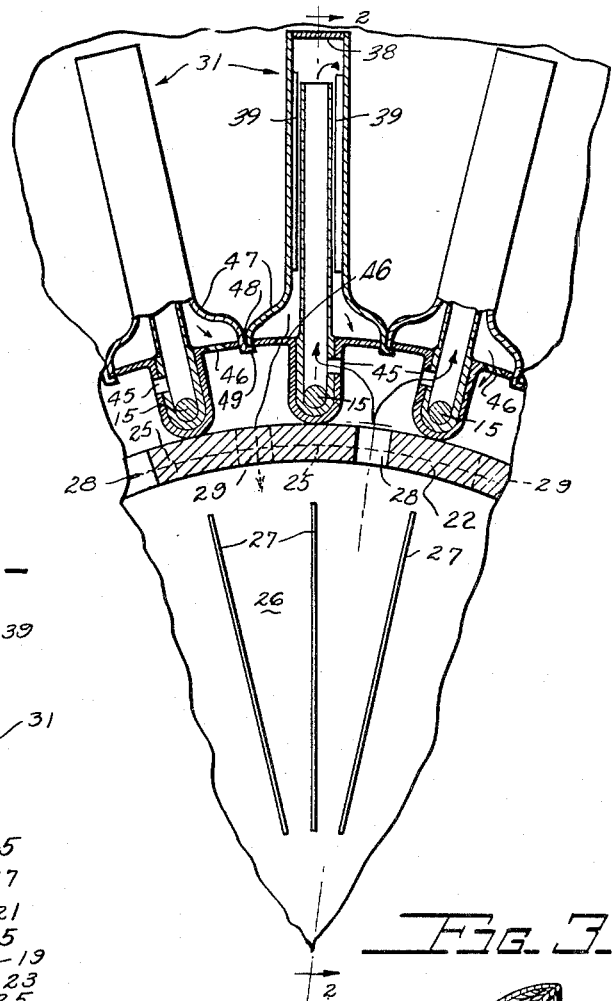
Fig. 1 is a fragmentary view of a turbine rotor made in accordance with this invention with parts shown in section.
Figure 2:
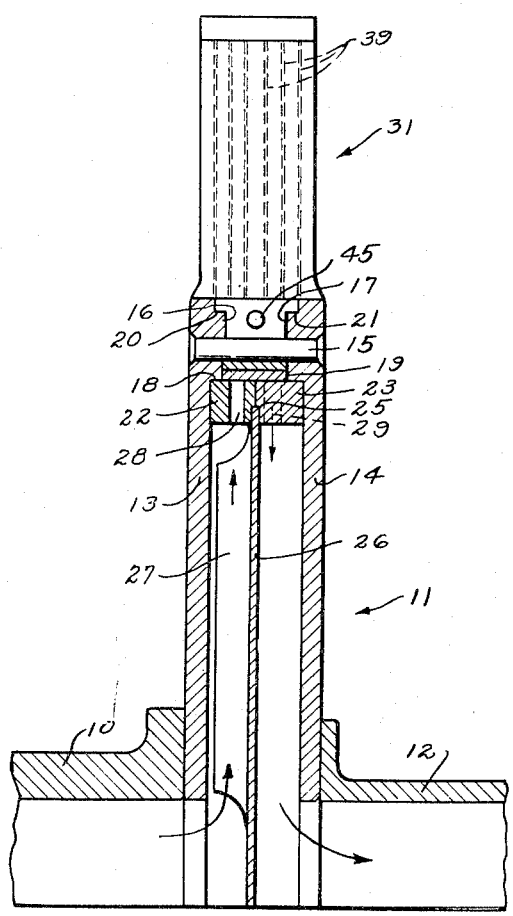
Fig. 2 is a sectional view taken along the line 2—2 of Fig. 1.

Referring more particularly to Figs. 1 and 2, there is shown a hollow turbine main shaft 10 having a turbine rotor disk 11 secured at one face thereto and a hollow extension 12 made integral with the other face of the turbine rotor disk. The rotor disk 11 is composed of complementary disks 13 and 14 that are held together by slightly tapered rivets 15 equally spaced about the periphery thereof. Each disk 13 and 14 has an annular thickened portion 16 and 17, respectively, near the periphery thereof to form inwardly facing shoulders 18 and 19, respectively, and outwardly facing shoulders 20 and 21, respectively, of equal diameters. A composite ring formed in two sections 22 and 23 rests against the shoulders 18 and 19 of the disks, the distance across the composite ring determining the space between the disks 13 and 14. An annular groove 25 at the juncture of the composite ring sections retains an imperforate disk 26 having spaced radial fins 27 integral therewith on the side nearest the main shaft 10. The ring section 22 has a plurality of holes 28 drilled radially therethrough at positions substantially between every other pair of rivets 15; while the ring section 23 has holes 29 drilled radially therein positioned between the rivets 15 other than where the holes 28 are positioned.

Figure 3:
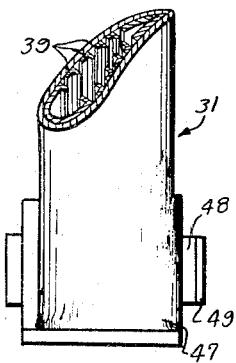
Fig. 3 is an isometric view of a turbine blade constructed in accordance with this invention with the blade head in section.

Each rivet, while holding the complementary disks 13 and 14 together as a unit, also retains a turbine blade in place, generally referred to by the reference character 31. Each turbine blade is composed of five elements, better shown in the exploded view of Fig. 4. The turbine blade holder is preferably formed from a piece of cylindrical pipe which is stretched to form a cone thickened at the root end to provide strength at the blade root and to provide a blade of light weight at the tip portion, but a pipe of unitary thickness may be used with good results. By splitting and pressing, this pipe (herein shown as pipe material of uniform thickness) is formed as shown by 32, Fig. 4. The sheet metal ends are welded at 33. Foot pieces 34 are formed preferably of flat strips and fitted and welded to the blade holder root as better shown in Figs. 1 and 2. Each foot piece 34 serves as a support for the bending moment of the blade and for sealing the space in the rotor 11 between the blades. The blade sheath comprises three pieces 36, 37 and 38 welded together and to the blade holder 32 in a manner presently to be described. Each blade sheath member 36 and 37 is a plated sheet of metal in which the side exposed to the heat passing through the turbine consists of a thin, but weldable, sheet of any suitable type that is heat resisting and nonscaling. The cooling side constitutes the plate material of any suitable type which is formed with a thin sheet by pressing. The plating material is peeled and erected to form fins 39 in both sheath members in the well known manner. While the thin outer sheet makes a shield for the gas heat, the plating supplies the material for the fins 39 and for conducting the heat and has little specific weight. The two sections of blade sheathing 36 and 37 are welded along the edges 40 and 41 of the blade holder and the head 38 is welded over the top of the joined sheet members to form the blades as illustrated in Figs. 1, 2 and 3. It is noted that the root portion 32a of the blade holder and the foot element 34 are of a width to fit between the complementary disk elements 13 and 14, and engage the composite ring 22, 23 to divide the circumferential groove so formed in the rotor disk 11 and into small chambers closed at the top by flange portions 34a of the foot piece which extend outwardly to rest on the shoulders 20 and 21 to provide radial stability to the blade. Every other one of these small chambers fluidly communicates with the interior of the rotor disk 11 on the side of the radial fins 27 via holes 28 and with the interior of the blade holder through ports 45. Ports 46 in the flanged portions 34a of the foot pieces complete the circuit of fluid flow from the central opening of the blade holder, between the blade holder and the finned portions of the blade sheath, through the holes 29 to the rotor disk interior, as indicated by the arrows in Fig. 1. The sheath formed by 36, 37 and 38 is flared outwardly at the root end, as shown at 47, and has ears 48 (Fig. 3) to enter the circumferential groove for completely inclosing the foot pieces 34 in the rotor disk 11. The corresponding ear 48 of each blade sheath is longer than the other ear and turns outwardly as shown at 49 to rest under the next adjacent blade sheath to produce an effective seal. It is noted that the rotor blades are made in pairs and therefore the number of rotor blades, tapered rivets, and ports for the rotor blades are used in multiples of 2. In order to produce a companion blade to the one shown in Fig. 4 it is only necessary to reverse the position of the holes 45 and 46.

Mounting the rotor blades in the manner above described provides a durable turbine rotor of low cost construction. The blades are securely held by the rivets 15 with a force opposing the centrifugal force on the blades during rotor rotation. The force between the flanges 34a of the blade foot pieces and the shoulders 20, 21 of the rotor disk is in the direction of the centrifugal force such that a force acts on the foot piece flanges on opposite sides of the longitudinal centerline of each blade in opposition to the force produced through the agency of the rivet 15 to provide radially stable blades with sufficient resiliency to eliminate frictional corrosion and metal fatigue. Considerable tolerances are allowable in the machine processing of the rotor disk and rivet openings for blade mounting which greatly reduces the cost of manufacture since these tolerances are not detrimental to the operation of the turbine rotor.

In operation, intake air enters the hollow main shaft 10 and flows to the disk 26 where the turbine rotation centrifugally forces the air radially outward by the fins 27. The air passes through the holes 28 and 45 into the central passage of the blade holder 32, being still acted upon by centrifugal force, and outward to the blade heads. The air contacts the blade sheaths which are heated by hot gas flow of the turbine. The heating of the air lowers the air density which results in a "lift" of the warm air toward the axis of revolution. This lift or power will be augmented in the centrifugal field. As the air passes along the blade between the blade holder and sheathing, it becomes increasingly warmer and increases the thermic lift power. The heat transfer from the blade sheathing to the air coolant keeps the blades at a safe operating temperature.

This change of air density to produce a reversal of the air flow in the centrifugal field is actually a thermosyphoning action which results in a centripetal force. The centripetal force of flow will then be increased by simultaneous rotation and warming of the air coolant. The air coolant returns through the holes 46 and 29 through the space between the imperforate disk 26 and the disk member 14 to pass out the hollow shaft 12 to the exterior thereof.

The air cooling system just described requires very little expenditure of power from the turbine. The ratio of air flow for combustion is unaffected by the cooling air taken in the main hollow shaft 10 and a great head of cooling air is made available. The construction of the blades is such that the blade holders are protected from the high turbine temperatures which prevents metal "creep" and undue bending of the turbine blades. The cooling fins provide a high heat transfer wherein the turbine rotor, including the blades, are rapidly cooled making higher turbine temperatures and higher turbine speeds possible.

From the foregoing, it may be readily understood that various changes and modifications may be made without departing from the spirit and scope of this invention and I desire to be limited only by the appended claims.

I claim:

1. An air cooled turbine rotor assembly for axial flow turbines comprising, a pair of complementary centrally apertured concentric disks, a ring separating said complementary disks and contacting the adjacent sides of the disks near their periphery, means securing said disks to the separating ring and to each other, an imperforate disk having its periphery fixed in said ring and spaced about equally from each of said pair of disks to divide the space between the pair of disks into inlet and exhaust chambers, said imperforate disk having integral radial ventilating fins on the side facing said inlet chamber, a plurality of hollow rotor blades fixed in radial relation to the composite turbine rotor periphery, means providing communicating passages from said inlet chamber to the interior of each rotor blade, means providing communicating passages from the interior of each rotor blade to said exhaust chamber, and separate coaxial hollow shaft elements fixed to the centrally apertured disks to rotatably support the turbine rotor and for conducting cooling air into said inlet chamber through one shaft element and heated air from said exhaust chamber through the other shaft element.

2. An air cooled turbine rotor assembly as set forth in claim 1, wherein said separating ring comprises two complementary ring members having a groove at their juncture in which is supported said imperforate disk.

3. An air cooled turbine rotor assembly for axial flow turbines comprising a turbine rotor disk composed of two complementary centrally apertured concentric disks each having an annular inturned raised portion adjacent the periphery thereof forming inwardly and outwardly facing shoulders of equal diameters, respectively, a ring separating said complementary disks and resting against said inwardly facing shoulders thereof to hold said complementary disks in a predetermined spaced relation, an imperforate disk having its periphery fixed in said ring midway of said complementary disks to divide the space between said complementary disks into separate inlet and exhaust chambers on opposite sides of said disk, said imperforate disk having radial ventilating fins on the side of said inlet chamber, a hollow main shaft fixed concentrically to the one of the complementary disks forming a wall of said inlet chamber with the hollow portion thereof in communication with said inlet chamber, an even number of rivets about the periphery of said rotor disk passing through the complementary disks in the raised portions thereof to retain said complementary disks in their spaced relation against said ring, an even number of rotor blades radially spaced about the periphery of said rotor disk, said rotor blades each having a blade holder with a U-shaped shouldered root portion that fits between the annular inturned raised portions of said complementary disks and passes under one each of said rivets to retain the shoulders of the root portion firmly against the outwardly facing shoulders of said complementary disks, and a sheath having inturned fins surrounding each said blade holder and fastened thereto along two longitudinal portions forming ventilating passages between said sheathing and said blade holder, the root portions of said blade holders and said ring being ported to provide communication between said rotor blades and said inlet chamber, and said ventilating passages of said rotor blades being in communication with said exhaust chamber through passages in said ring whereby rotation of said turbine rotor assembly by passage of hot gases across the rotor blades centrifugally forces air drawn in from the atmosphere through said hollow main shaft and rotor disk into the rotor blades where the air density is reduced sufficiently by heat transfer from the hot turbine gases through the blade sheathing to produce a lift of the air through the ventilating passages of said rotor blades and the centrifugal field of the exhaust chamber to be exhausted out the central aperture of the complementary disk associated with the exhaust chamber.

4. An air cooled turbine rotor assembly for axial flow turbines as set forth in claim 3 wherein said ring is composed of two complementary ring members having a groove at their juncture in which is supported said imperforate disk.

5. An air cooled turbine rotor assembly for axial flow turbines comprising a hollow rotor disk having an intake chamber for centrifugally directing air to the disk periphery and an exhaust chamber, said rotor disk having a shouldered circumferential groove, an even number of rotor blades each having a tubular blade holder the root end of which is U-shaped in longitudinal cross section, a U-shaped member having outstanding flange portions at the extremeties thereof welded over the root portion of each tubular blade holder, the U-shaped portion of each rotor blade being fitted within said circumferential groove with said outstanding flanges resting on the shouldered portions of said groove, said blade holders being retained in said groove by pin means passing through the wall portions of the rotor disk having said groove and through the U-shaped portion of said blade holders whereby chambers are formed between the adjacent blade roots, first passage means connecting the central opening of said tubular blade holders of blade pairs with alternate of said chambers and said alternate of said chambers being in communication with said intake chamber, each said rotor blade further having a sheath enclosing each said blade holder and made integral therewith along at least two longitudinal portions such that communication is established between the central opening of said tubular blade holder and the space between the tubular blade holder and sheath, and second passage means connecting the space between said sheath and blade holder of one each of blade pairs with chambers between the blade roots comprising the other alternate chambers, said other alternate chambers being in communication with said rotor disk exhaust chamber whereby air centrifugally thrown radially outward of the inlet chamber upon turbine operation of the rotor assembly will pass through the passage means to the central opening of the blade holder thence to the blade sheath where it is warmed by heat conduction through the sheathing by turbine gases to lower its density and diminish the centrifugal force acting thereon sufficently to cause it to lift to said exhaust chamber through said space and said second passage means thereby cooling said blades to safe operating temperatures.

6. An air cooled turbine rotor assembly for axial flow turbines as set forth in claim 5 wherein the sheathing of each rotor blade has longitudinally inturned fins in the space between said blade holder and sheathing to increase the cooling area.

References Cited in the file of this patent

UNITED STATES PATENTS

| | | |
|---|---|---|
| 1,325,208 | Rice | Dec. 16, 1919 |
| 1,657,192 | Belluzzo | Jan. 24, 1928 |
| 1,708,402 | Schilling | Apr. 9, 1929 |
| 1,966,104 | Noack | July 10, 1934 |
| 2,073,605 | Belluzzo | Mar. 16, 1937 |
| 2,393,963 | Berger | Feb. 5, 1946 |
| 2,401,826 | Halford | June 11, 1946 |

FOREIGN PATENTS

| | | |
|---|---|---|
| 369,996 | Germany | 1923 |
| 420,781 | Germany | Oct. 31, 1925 |